United States Patent
Kakura et al.

(10) Patent No.: US 6,314,133 B1
(45) Date of Patent: Nov. 6, 2001

(54) AUTOMATIC EQUALIZER CAPABLE OF SURELY SELECTING A SUITABLE SAMPLE TIMING A METHOD FOR GENERATING SAMPLING CLOCK USED FOR THE SAMPLE TIMING AND A RECORDING MEDIUM USABLE IN CONTROL OF THE AUTOMATIC EQUALIZER

(75) Inventors: Yoshikazu Kakura; Tomoki Ohsawa, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/243,565

(22) Filed: Feb. 3, 1999

(30) Foreign Application Priority Data

Feb. 4, 1998 (JP) .................................................. 10-022475

(51) Int. Cl.[7] .................................................. H04L 27/01
(52) U.S. Cl. .......................................... 375/230; 375/355
(58) Field of Search .................................... 375/229, 230, 375/348, 355; 708/323

(56) References Cited

U.S. PATENT DOCUMENTS 5,537,419 * 7/1996 Parr et al. ......................... 370/100.1
5,923,226 * 7/1999 Kakura et al. ......................... 333/18

FOREIGN PATENT DOCUMENTS 10-65580    3/1998    (JP) .

* cited by examiner

*Primary Examiner*—Amanda T. Le
(74) *Attorney, Agent, or Firm*—Scully, Scott, Murphy & Presser (57) ABSTRACT

An automatic equalizer has a sampling-clock producing arrangement which is for, before selecting a sample timing, producing a sampling clock at the rate of L times of that after selecting, and after selecting the sample timing, producing a tap-coefficient selection signal according to the sample timing, and a sampling clock at the rate of 1/L times of that before selecting, according to the sample timing. In the sampling-clock producing arrangement, demodulation components are obtained in absolute values of impulse-response signals with respect to L sample timings, respectively. A selecting arrangement selects the sample timing by the use of the demodulation components. The impulse-response signals are produced in response to a sampled received-signal obtained by sampling a received signal with the sampling clock.

20 Claims, 6 Drawing Sheets

(PRIOR ART)

AUTOMATIC EQUALIZER CAPABLE OF SURELY SELECTING A SUITABLE SAMPLE TIMING A METHOD FOR GENERATING SAMPLING CLOCK USED FOR THE SAMPLE TIMING AND A RECORDING MEDIUM USABLE IN CONTROL OF THE AUTOMATIC EQUALIZER

BACKGROUND OF THE INVENTION

The present invention relates to an automatic equalizer and a method for generating a sampling clock used therein, and a recording medium in which a control program for controlling the automatic equalizer with a computer is stored, particularly to an automatic equalizer for automatically equalizing a signal which has been distorted due to an intersymbolic interference, and a method for generating a sampling clock used therein, and a recording medium in which a control program for controlling the automatic equalizer with a computer is stored.

In a method of selecting a sample timing in an automatic equalizer, the timing is selected by which the impulse response having the maximum peak value is obtained. Hereinafter, a case of applying this method to an automatic equalizer described in Japanese Unexamined Patent Publication (JP-A) No. Hei 10-65580 by the present applicant will be described as an earlier technology with reference to FIG. 1.

Figure 1:
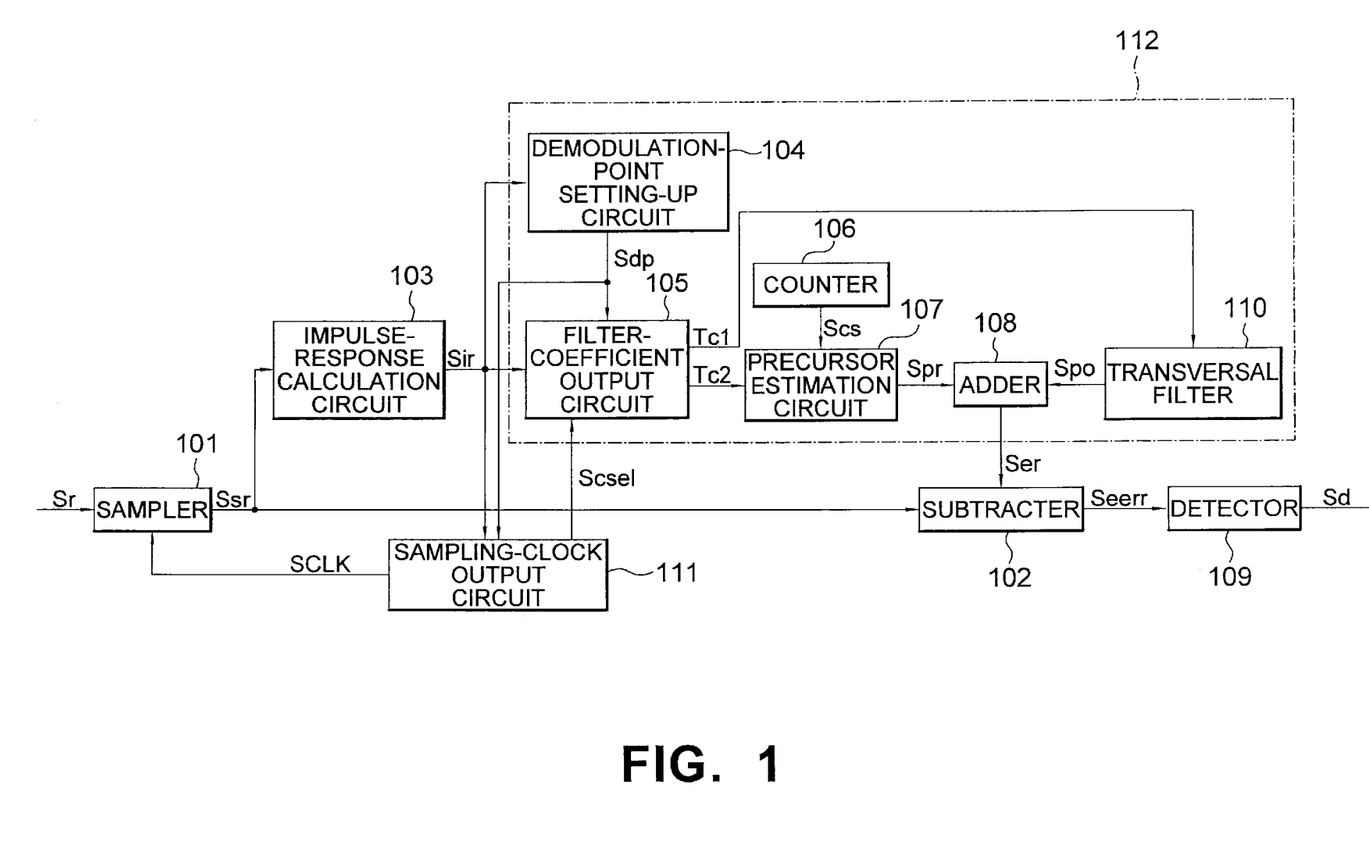
FIG. 1 is a block diagram showing the construction of a general automatic equalizer.

The automatic equalizer shown in FIG. 1 comprises a sampler 101 for sampling a received signal Sr with a sampling clock SCLK to output a sampled received-signal Ssr, a subtracter 102 having inputs of the sampled received-signal Ssr and N estimated received-signals Ser, where N represents a positive integer, for producing N estimated error signals Seerr, and a detector 109 having an input of the N estimated error signals Seerr for producing a part of the maximum likelihood transmission signal sequence to the outside as a detected output-signal Sd.

The automatic equalizer further comprises an impulse-response calculation circuit 103 having an input of the sampled received-signal Ssr for obtaining impulse responses of the sampled received-signal Ssr to output impulse-response signals Sir, a sampling-clock output circuit 111 having inputs of the impulse-response signals Sir and a demodulation-point setting-up signal Sdp for producing a sampling clock SCLK and a tap-coefficient selection signal Scsel, and a received-signal estimation circuit 112 having inputs of the impulse-response signals Sir and the tap-coefficient selection signal Scsel for producing a demodulation-point setting-up signal Sdp and N estimated received-signals Ser.

Before selecting a sample timing, the sampling-clock output circuit 111 having inputs of the impulse-response signals Sir and the demodulation-point setting-up signal Sdp outputs a sampling clock at the rate of L times of that after selecting. After selecting the sample timing, the sampling-clock output circuit 111 outputs a tap-coefficient selection signal Scsel according to the selected sample timing, and a sampling clock SCLK at the rate of 1/L times of that before selecting, according to the selected sample timing.

The received-signal estimation circuit 112 having inputs of the impulse-response signals Sir and the tap-coefficient selection signal Scsel outputs N estimated received-signals Ser and a demodulation-point setting-up signal Sdp corresponding to the demodulation component by the use of a tap coefficient of one among the impulse-response signals Sir corresponding to one selected from L sample timings, where L represents a positive integer, with the tap-coefficient selection signal Scsel. This received-signal estimation circuit 112 comprises a demodulation-point setting-up circuit 104 for producing a demodulation-point setting-up signal Sdp, a filter-coefficient output circuit 105 for producing filter-coefficient groups Tc1 and Tc2, a counter 106 for producing a transmission signal sequence Scs, a precursor estimation circuit 107 for producing a precursor estimation signal Spr, an adder 108 for producing N estimated received-signals Ser, and a transversal filter 110 for producing a postcursor estimation signal Spo. The distortion components generated in a signal include precursor components, which are generated before the peak in the signal, and postcursor components, which are generated after the peak in the signal.

In this construction, the sampler 101 samples a received signal Sr with a sampling clock SCLK and outputs a sampled received-signal Ssr. The subtracter 102 subtracts each of N estimated received-signals Ser from the sampled received-signal Ssr to output each of N estimated error signals Seerr. The detector 109 having an input of the N estimated error signals Seerr detects the least significant bit of the sequence corresponding to one of the estimated error signals Seerr in which signal the minimum absolute value is obtained, as a value that the distortion components are removed from the received signal Sr, and outputs it to the outside as a detected output-signal Sd.

Figure 8A:
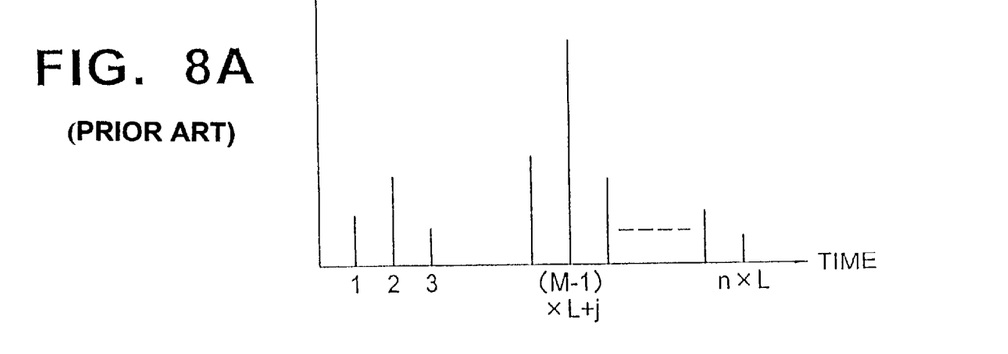
FIG. 8 is a couple of graphs showing the second example of impulse responses, wherein (a) shows an input to an impulse-response calculation circuit and (b) shows outputs at the impulse-response calculation circuit.
Figure 8B:
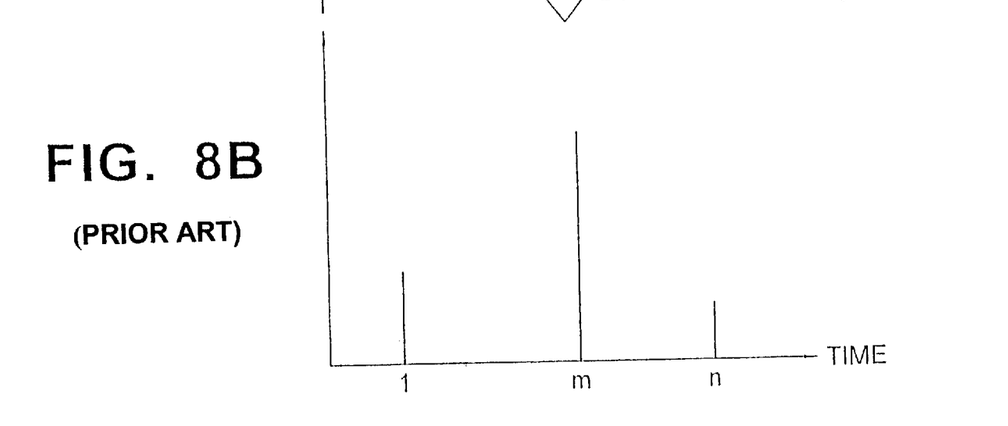

The impulse-response calculation circuit 103 having an input of a received signal Sr, for example, as shown in FIG. 8(a), obtains impulse responses as shown in FIG. 8(b) and outputs them as impulse-response signals Sir. The demodulation-point setting-up circuit 104 having inputs of the impulse-response signals Sir as shown in FIG. 8(b) outputs a demodulation-point setting-up signal Sdp corresponding to the impulse response having the maximum absolute value with respect to each of L sample timings.

The filter-coefficient output circuit 105 has inputs of the impulse-response signals Sir, the demodulation-point setting-up signal Sdp and a tap-coefficient selection signal Scsel. If the m-th impulse response among the n impulse responses, where m and n represent positive integers, respectively, in the impulse-response signal Sir corresponding to a sample timing j selected from L sample timings, where j represents a positive integer, with the tap-coefficient selection signal Scsel is the maximum, this filter-coefficient output circuit 105 outputs the (m+1)th to n-th impulse responses as a filter-coefficient group Tc1, and the 1st to m-th impulse responses as a filter-coefficient group Tc2.

The counter 106 outputs a transmission signal sequence Scs that represents 0 to N-1 by binary number. The precursor estimation circuit 107 having inputs of the filter-coefficient group Tc2 and the transmission signal sequence Scs estimates the precursor components of the received signal Sr and outputs N precursor estimation signals Spr. The adder 108 adds each of the N precursor estimation signals Spr to a postcursor estimation signal Spo to output each of N estimated received-signals Ser.

The transversal filter 110 having inputs of a detected output-signal Sd and the filter-coefficient group Tc1 outputs postcursor estimation signals Spo corresponding to the postcursor components of the distortion. Before selecting a sample timing, the sampling-clock output circuit 111 having inputs of the impulse-response signals Sir and the demodulation-point setting-up signal Sdp outputs a sampling clock SCLK at the rate of L times of that after selecting. After selecting the sample timing by which the impulse response having the maximum peak value is obtained, the sampling-clock output circuit 111 outputs a tap-coefficient selection signal Scsel according to the selected sample timing, and a sampling clock SCLK at the rate of 1/L times of that before selecting, according to the selected sample timing.

Figure 9:
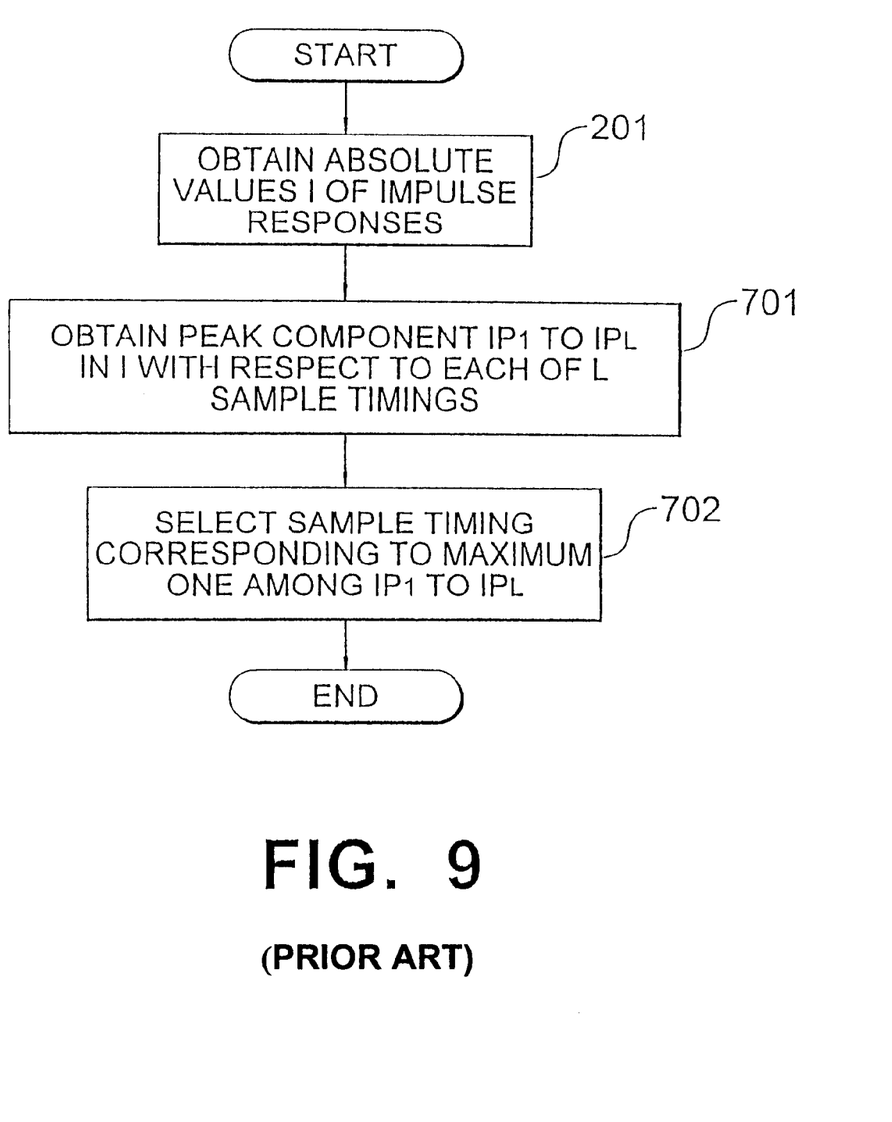
FIG. 9 is a flowchart showing a process of selecting a sample timing in a prior art automatic equalizer.

As described above, in the prior art automatic equalizer, the timing is selected by which the impulse response having the maximum peak value is obtained. That is, in the sampling-clock output circuit 111, as shown in FIG. 9, after obtaining the absolute values I of impulse responses (step 201), the peak components IP1 to IPL in the absolute values I are respectively obtained with respect to L sample timings (step 701). The sample timing corresponding to the maximum one among the peak components IP1 to IPL is then selected (step 702).

In an automatic equalizer of feedback type (for example, an automatic equalizer described in Japanese Patent Unexamined Publication No. Hei 5-14126), in which the postcursor components are highly important in estimation, there is a case that its characteristics are rather good even in case of the peak values of impulse responses being slightly small if the postcursor components are great. In an automatic equalizer in which an error is apt to arise when the precursor components are great, the error is apt to arise even in case of the peak values of impulse responses being large if the precursor components are great. In an automatic equalizer in which the demodulation components do not coincide with the peak values of impulse responses, there is a case that the demodulation components are small even in case of the peak values being large, and so its characteristics become bad. In such a prior art method, there is therefore a drawback that the most suitable sample timing may not be selected.

SUMMARY OF THE INVENTION

It is therefore an object of the present invention to provide an automatic equalizer in which the most suitable sample timing can be surely selected.

It is another object of the present invention to provide a method which is for generating sampling clock used for the sample timing.

It is still another object of the present invention to provide a recording medium which is usable in control of the automatic equalizer.

Other objects of the present invention will become clear as the description proceeds. An automatic equalizer to which the present invention is applicable comprises detection means for producing a part of a transmission signal sequence in response to difference between a sampled received-signal and each of N estimated received signals (N: a positive integer), said sampled received-signal being obtained by sampling a received signal with a sampling clock, impulse-response calculation means for producing impulse-response signals in response to said sampled received-signal, received-signal estimation means for producing said N estimated received signals by the use of a tap coefficient of one among said impulse-response signals corresponding to a sample timing selected from L sample timings (L: a positive integer) with a tap-coefficient selection signal, and sampling-clock producing means for, before selecting said sample timing, producing a sampling clock at the rate of L times of that after selecting, and after selecting said sample timing, producing said tap-coefficient selection signal according to said sample timing, and a sampling clock at the rate of 1/L times of that before selecting, according to said sample timing. In the automatic equalizer, the sampling-clock producing means comprises primary obtaining means for obtaining demodulation components in absolute values of said impulse-response signals with respect to said L sample timings, respectively, and selecting means connected to said obtaining means for selecting said sample timing by the use of said demodulation components.

A method to which the present invention is applicable is for generating a sampling clock in an automatic equalizer which comprises detection means for producing a part of a transmission signal sequence in response to difference between a sampled received-signal and each of N estimated received signals (N: a positive integer), said sampled received-signal being obtained by sampling a received signal with a sampling clock, impulse-response calculation means for producing impulse-response signals in response to said sampled received-signal, received-signal estimation means for producing said N estimated received signals by the use of a tap coefficient of one among said impulse-response signals corresponding to a sample timing selected from L sample timings (L: a positive integer) with a tap-coefficient selection signal, and sampling-clock producing means for, before selecting said sample timing, producing a sampling clock at the rate of L times of that after selecting, and after selecting said sample timing, producing said tap-coefficient selection signal according to said sample timing, and a sampling clock at the rate of 1/L times of that before selecting, according to said sample timing. The method comprises a primary obtaining step of obtaining demodulation components in absolute values of said impulse-response signals with respect to said L sample timings, respectively, and a selecting step of selecting said sample timing by the use of said demodulation components.

According to the present invention, there is provided a recording medium in which a control program is stored for making a computer control an automatic equalizer comprising detection means for producing a part of a transmission signal sequence in response to difference between a sampled received-signal and each of N estimated received signals (N: a positive integer), said sampled received-signal being obtained by sampling a received signal with a sampling clock, impulse-response calculation means for producing impulse-response signals in response to said sampled received-signal, received-signal estimation means for producing said N estimated received signals by the use of a tap coefficient of one among said impulse-response signals corresponding to a sample timing selected from L sample timings (L: a positive integer) with a tap-coefficient selection signal, and sampling-clock producing means for, before selecting said sample timing, producing a sampling clock at the rate of L times of that after selecting, and after selecting said sample timing, producing said tap-coefficient selection signal according to said sample timing, and a sampling clock at the rate of 1/L times of that before selecting, according to said sample timing. In the recording medium, said control program makes said computer be operable as primary obtaining means for obtaining demodulation components in absolute values of said impulse-response signals with respect to said L sample timings, respectively, and as selecting means for selecting said sample timing by the use of said demodulation components.

DESCRIPTION OF THE PREFERRED EMBODIMENTS

Next, embodiments of the present invention will be described with reference to drawings.

An automatic equalizer according to the present invention is shown by the same block diagram as FIG. 1. The difference from the prior art is in process of selecting a sample timing in the sampling-clock output circuit 111. In the sampling-clock output circuit 111, a sample timing is selected in consideration of change in characteristic with a factor other than the peak value of impulse responses. Hereinafter, processes of selecting a sample timing in the sampling-clock output circuit 111 will be described according to embodiments of the present invention.

Figure 2:
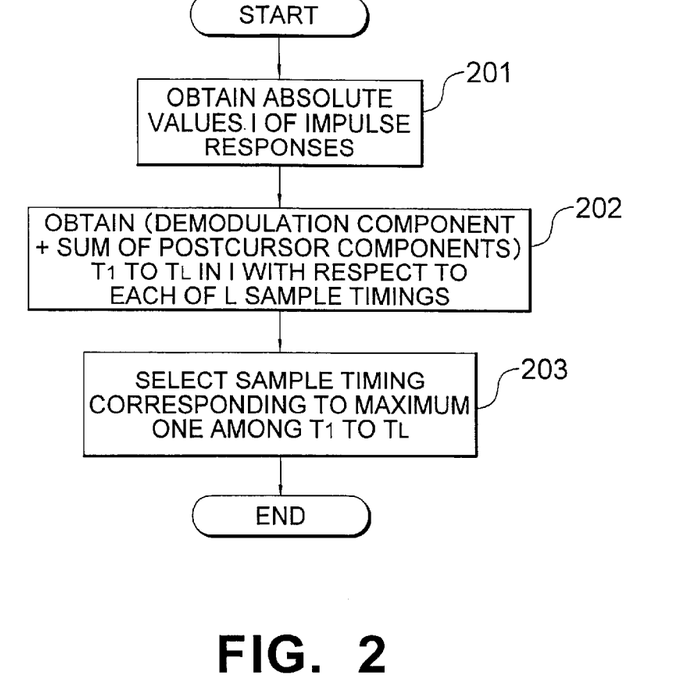
FIG. 2 is a flowchart showing a process of selecting a sample timing in an automatic equalizer according to the first embodiment of the present invention.

FIG. 2 is a flowchart showing a process of selecting a sample timing in the sampling-clock output circuit 111 in FIG. 1, according to the first embodiment of the present invention. In FIG. 2, the same part as that in FIG. 9 is denoted by the same reference as that in FIG. 9.

Referring to FIG. 2, in the sampling-clock output circuit 111, after obtaining the absolute values I of impulse responses (step 201), calculations T1 to TL of (the demodulation component+the sum of the postcursor components) in the absolute values I are respectively made with respect to L sample timings (step 202). The sample timing corresponding to the maximum one among the calculations T1 to TL of (the demodulation component+the sum of the postcursor components) is then selected (step 203). On obtaining the demodulation components, the sampling-clock output circuit 111 is referred to as a primary obtaining arrangement. On obtaining the postcursor components as distortion components in the absolute values, the sampling-clock output circuit 111 will be referred to as a secondary obtaining arrangement. On summing the demodulation components and a sum of the postcursor components, the sampling-clock output circuit 111 will be referred to as a calculating arrangement. On carrying out the step 203, the sampling-clock output circuit 111 is referred to as a selecting arrangement.

Figure 3:
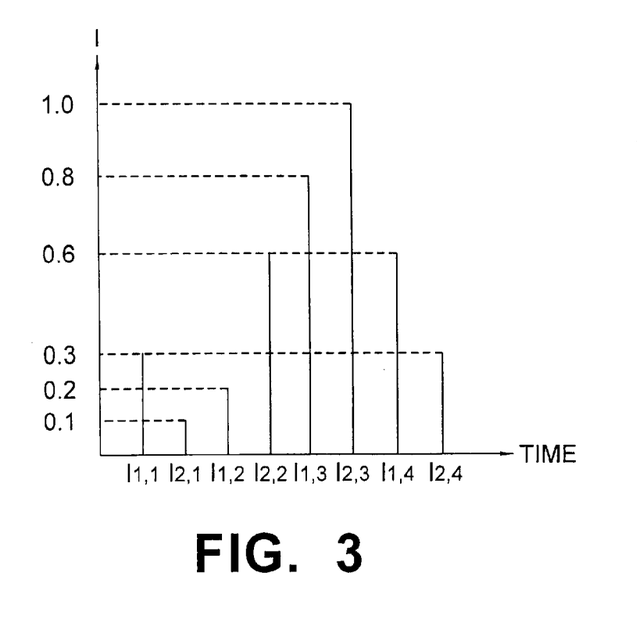
FIG. 3 is a graph showing the first example of impulse responses.

Now, we consider a case that a sample timing is determined for a received signal Sr having the absolute values I of impulse responses as shown in FIG. 3 for example. Here, we assume that the absolute values I with respect to a sample timing 1 are I1,1, I1,2, I1,3 and I1,4 in order of the propagation delay increasing, and the absolute values I with respect to a sample timing 2 are I2,1, I2,2, I2,3 and I2,4 in order of the propagation delay increasing. Further assuming that the demodulation components of the received signal Sr correspond to the peak values I1,3 and I2,3 in the absolute values I with respect to the sample timings 1 and 2, respectively, the calculation T1 of (the demodulation component+the sum of the postcursor components) with respect to the sample timing 1 is T1=I1,3+I1,4=0.8+0.6=1.4, and the calculation T2 of (the demodulation component+the sum of the postcursor components) with respect to the sample timing 2 is T2=I2,3+I2,4=1.0+0.3=1.3.

Hence, because T1>T2, the sample timing 1 is selected, and accordingly a sampling clock SCLK and a tap-coefficient selection signal Scsel are determined. By the operation as described above, selecting a sample timing in consideration of an influence of the postcursor components can be performed.

Figure 4:
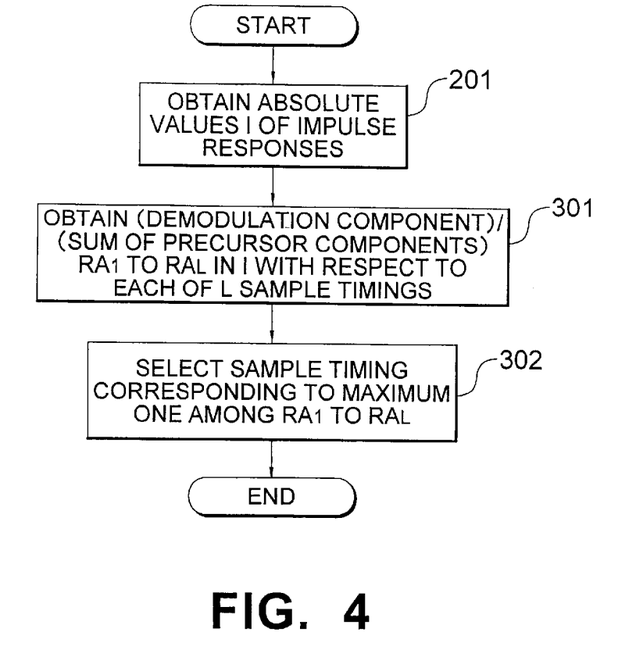
FIG. 4 is a flowchart showing a process of selecting a sample timing in an automatic equalizer according to the second embodiment of the present invention.

FIG. 4 is a flowchart showing a process of selecting a sample timing in the sampling-clock output circuit 111 in FIG. 1, according to the second embodiment of the present invention. In FIG. 4, the same part as that in FIG. 2 or 9 is denoted by the same reference as that in FIG. 2 or 9.

Referring to FIG. 4, in the sampling-clock output circuit 111, after obtaining the absolute values I of impulse responses (step 201), calculations RA1 to RAL of (the demodulation component)/(the sum of the precursor components) in the absolute values I are respectively made with respect to L sample timings (step 301). The sample timing corresponding to the maximum one among the calculations RA1 to RAL of (the demodulation component)/ (the sum of the precursor components) is then selected (step 302). On obtaining the precursor components as the distortion components in the absolute values, the sampling-clock output circuit 111 will be referred to as the secondary obtaining arrangement. On dividing the demodulation components by a sum of the precursor components, the sampling-clock output circuit 111 will be referred to as a dividing arrangement.

Assuming that the demodulation components of the received signal Sr correspond to the peak values I1,3 and I2,3 in the absolute values I with respect to the sample timings 1 and 2, respectively, the calculation RA1 of (the demodulation component)/(the sum of the precursor components) with respect to the sample timing 1 is RA1= I1,3/(I1,1+I1,2)=0.8/(0.3+0.2)=1.6, and the calculation RA2 of (the demodulation component)/(the sum of the precursor components) with respect to the sample timing 2 is RA2= I2,3/(I2,1+I2,2)=1.0/(0.1+0.6)≈1.4.

Hence, because RA1>RA2, the sample timing 1 is selected, and accordingly a sampling clock SCLK and a tap-coefficient selection signal Scsel are determined. By the operation as described above, selecting a sample timing in consideration of an influence of the precursor components can be performed.

Figure 5:
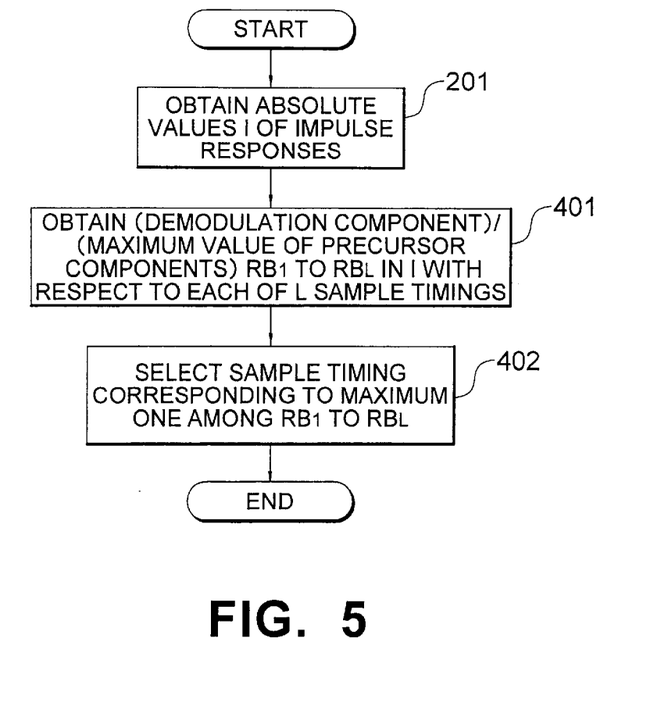
FIG. 5 is a flowchart showing a process of selecting a sample timing in an automatic equalizer according to the third embodiment of the present invention.

FIG. 5 is a flowchart showing a process of selecting a sample timing in the sampling-clock output circuit 111 in FIG. 1, according to the third embodiment of the present invention. In FIG. 5, the same part as that in FIG. 2, 4 or 9 is denoted by the same reference as that in FIG. 2, 4 or 9.

Referring to FIG. 5, in the sampling-clock output circuit 111, after obtaining the absolute values I of impulse responses (step 201), calculations RB1 to RBL of (the demodulation component)/(the maximum value of the precursor components) in the absolute values I are respectively made with respect to L sample timings (step 401). The sample timing corresponding to the maximum one among the calculations RB1 to RBL of (the demodulation component)/(the maximum value of the precursor components) is then selected (step 402). On dividing the demodulation components by the maximum value or a largest one of the precursor components, the sampling-clock output circuit 111 will be referred to as a dividing arrangement.

Assuming that the demodulation components of the received signal Sr correspond to the peak values I1,3 and I2,3 in the absolute values I with respect to the sample timings 1 and 2, respectively, the calculation RB1 of (the demodulation component)/(the maximum value of the precursor components) with respect to the sample timing 1 is RB1=I1,3/I1,1=0.8/0.3≈2.7, and the calculation RB2 of (the demodulation component)/(the maximum value of the precursor components) with respect to the sample timing 2 is RB2=I2,3/I2,2=1.0/0.6≈1.7.

Hence, because RB1>RB2, the sample timing 1 is selected, and accordingly a sampling clock SCLK and a tap-coefficient selection signal Scsel are determined. By the operation as described above, selecting a sample timing in consideration of an influence of the precursor components can be performed.

Figure 6:
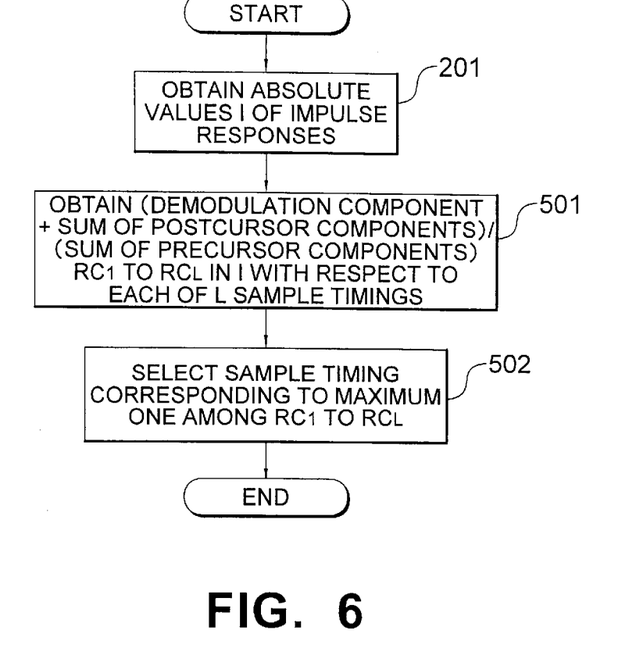
FIG. 6 is a flowchart showing a process of selecting a sample timing in an automatic equalizer according to the fourth embodiment of the present invention.

FIG. 6 is a flowchart showing a process of selecting a sample timing in the sampling-clock output circuit 111 in FIG. 1, according to the fourth embodiment of the present invention. In FIG. 6, the same part as that in FIG. 2, 4, 5 or 9 is denoted by the same reference as that in FIG. 2, 4, 5 or 9.

Referring to FIG. 6, in the sampling-clock output circuit 111, after obtaining the absolute values I of impulse responses (step 201), calculations RC1 to RCL of (the demodulation component+the sum of the postcursor components)/(the sum of the precursor components) in the absolute values I are respectively made with respect to L sample timings (step 501) to produce a divided value. The sample timing corresponding to the maximum one among the calculations RC1 to RCL of (the demodulation component+the sum of the postcursor components)/(the sum of the precursor components) is then selected (step 502). On summing the demodulation component and the postcursor components to produce summed values, the sampling-clock output circuit 111 will be referred to as a summing arrangement. On dividing the summed values by the sum of the precursor components, the sampling-clock output circuit 111 will be referred to as a dividing arrangement.

Assuming that the demodulation components of the received signal Sr correspond to the peak values I1,3 and I2,3 in the absolute values I with respect to the sample timings 1 and 2, respectively, the calculation RC1 of (the demodulation component+the sum of the postcursor components)/(the sum of the precursor components) with respect to the sample timing 1 is RC1=(I1,3+I1,4)/(I1,1+I1,2)=(0.8+0.6)/(0.3+0.2)=2.8, and the calculation RC2 of (the demodulation component+the sum of the postcursor components)/(the sum of the precursor components) with respect to the sample timing 2 is RC2=(I2,3+I2,4)/(I2,1+I2,2)=(1.0+0.3)/(0.1+0.6)≈1.9.

Hence, because RC1>RC2, the sample timing 1 is selected, and accordingly a sampling clock SCLK and a tap-coefficient selection signal Scsel are determined. By the operation as described above, selecting a sample timing in consideration of an influence of the precursor components and the postcursor components can be performed.

Figure 7:
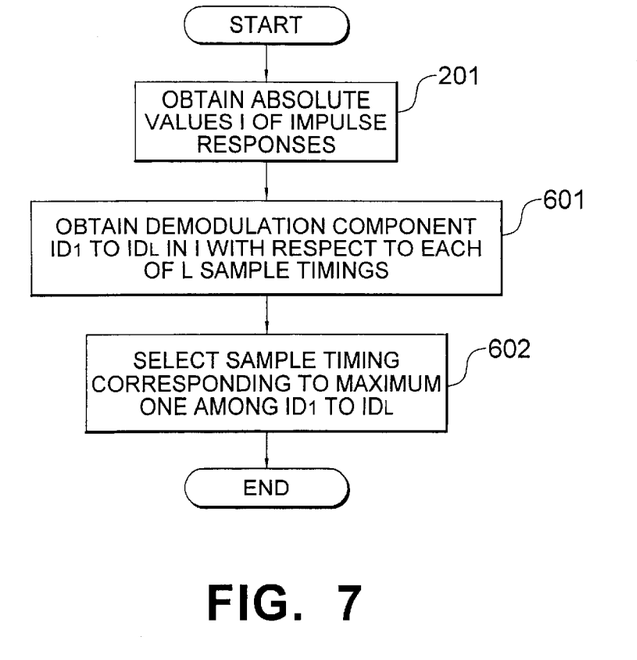
FIG. 7 is a flowchart showing a process of selecting a sample timing in an automatic equalizer according to the fifth embodiment of the present invention.

FIG. 7 is a flowchart showing a process of selecting a sample timing in the sampling-clock output circuit 111 in FIG. 1, according to the fifth embodiment of the present invention. In FIG. 7, the same part as that in FIG. 2, 4, 5, 6 or 9 is denoted by the same reference as that in FIG. 2, 4, 5, 6 or 9.

Referring to FIG. 7, in the sampling-clock output circuit 111, after obtaining the absolute values I of impulse responses (step 201), the demodulation components ID1 to IDL in the absolute values I are respectively obtained with respect to L sample timings (step 601). The sample timing corresponding to the maximum one among the demodulation components ID1 to IDL is then selected (step 602).

Assuming that the demodulation components of the received signal Sr correspond to the absolute values I1,3 and I2,2 with respect to the sample timings 1 and 2, respectively, the demodulation component ID1 with respect to the sample timing 1 is ID1=I1,3=0.8, and the demodulation component ID2 with respect to the sample timing 2 is ID2=I2,2=0.6.

Hence, because ID1>ID2, the sample timing 1 is selected, and accordingly a sampling clock SCLK and a tap-coefficient selection signal Scsel are determined. By the operation as described above, selecting a sample timing with the intensity of the demodulation component can be performed.

It is obvious that the same operations as those described above can be performed if recording media are provided in which programs for carrying out the respective selecting processes as described above with FIGS. 2 and 4 to 7 are stored, and the automatic equalizer of FIG. 1 is controlled with the respective recording media. As the recording media, various kinds of recording media such as semiconductor memory devices and magnetic disc devices can be used.

It is also obvious that the same operations as those described above can be performed if a computer is controlled by the use of the respective programs stored in the above recording media. As the recording media, various kinds of recording media such as semiconductor memory devices and magnetic disc devices can be used.

As described above, the present invention has an effect that the most suitable sample timing can be surely selected by considering an influence other than the peak value of impulse responses.

What is claimed is:

1. An automatic equalizer comprising:

detection means for producing a part of a transmission signal sequence in response to difference between a sampled received-signal and each of N estimated received signals (N: a positive integer), said sampled received-signal being obtained by sampling a received signal with a sampling clock;

impulse-response calculation means for producing impulse-response signals in response to said sampled received-signal;

received-signal estimation means for producing said N estimated received signals by the use of a tab coefficient of one among said impulse-response signals corresponding to a sample timing selected from L sample timings (L: a positive integer) with a tap-coefficient selection signal; and sampling-clock producing means for, before selecting said sample timing, producing a sampling clock at the rate of L times of that after selecting, and after selecting said sample timing, producing said tap-coefficient selection signal according to said sample timing, and a sampling clock at the rate of 1/L times of that before selecting, according to said sample timing, said sampling-clock producing means comprising:

primary obtaining means for obtaining demodulation components in absolute values of said impulse-response signals with respect to said L sample timings, respectively;

selecting means connected to said obtaining means for selecting said sample timing by the use of said demodulation components; and secondary obtaining means for obtaining distortion components in said absolute values, respectively, said selecting means selecting said sample timing by the use of said distortion components together with said demodulation components.

2. An automatic equalizer as claimed in claim 1, wherein said secondary obtaining means obtains, as said distortion components, postcursor components in said absolute values, respectively, said sampling-clock producing means further comprising calculating means connected to said primary and said secondary obtaining means for summing said demodulation components and a sum of said postcursor components with respect to said L sample timings to produce summed values, respectively, said selecting means selecting, as said sample timing, a timing corresponding to a greatest one of said summed values.

3. An automatic equalizer as claimed in claim 1, wherein said secondary obtaining means obtains, as said distortion components, precursor components in said absolute values, respectively, said sampling-clock producing means further comprising dividing means connected to said primary and said secondary obtaining means for dividing said demodulation components by a sum of said precursor components to produce divided values, respectively, said selecting means selecting, as said sample timing, a timing corresponding to a greatest one of said divided values.

4. An automatic equalizer as claimed in claim 1, wherein said secondary obtaining means obtains, as said distortion components, precursor components in said absolute values, respectively, said sampling-clock producing means further comprising dividing means connected to said primary and said secondary obtaining means for dividing said demodulation components by a largest one of said precursor components to produce divided values, respectively, said selecting means selecting, as said sample timing, a timing corresponding to a greatest one of said divided values.

5. An automatic equalizer as claimed in claim 1, wherein said secondary obtaining means obtains, as said distortion components, precursor components and postcursor components in said absolute values, respectively, said sampling-clock producing means further comprising:

summing means connected to said primary and said secondary obtaining means for summing said demodulation components and said postcursor components to produce summed values with respect to said L sample timings, respectively; and dividing means connected to said secondary obtaining and said summing means for dividing said summed values by a sum of said precursor components to produce divided values, with respect said L sample timings, respectively, said selecting means selecting, as said sample timing, a timing corresponding to a greatest one of said divided values.

6. An automatic equalizer as claimed in claim 1, wherein said selecting means selects, as said sample timing, a timing corresponding to a greatest one of said demodulation components.

7. An automatic equalizer as claimed in claim 1, wherein said detection means comprises:

a sampler connected to said sampling-clock producing means and said impulse-response calculation means for sampling said received signal with said sampling clock to produce a sampled received-signal;

a subtracter connected to said sampler and said received-signal calculation means and responsive to said sampled received-signal and said N estimated received signals for producing N estimated error signals; and a detector connected to said subtracter and responsive to said N estimated error signals for producing, as said part of the transmission signal sequence, a part o a maximum likelihood transmission signal sequence.

8. An automatic equalizer as claimed in claim 1, wherein said received-signal estimation means comprises:

a demodulation-point setting-up circuit connected to said impulse-response calculation means and responsive to said impulse-response signals for producing a demodulation-point setting-up signal used in shifting the demodulation point from the point at which a maximum one of said absolute values;

a filter-coefficient output circuit connected to said impulse-response calculation means for producing a first filter coefficient group corresponding to postcursor components of said demodulation-point setting-up signal and a second filter coefficient group corresponding to precursor components of said demodulation-point setting-up signal;

a transversal filter connected to said filter-coefficient output circuit for estimating postcursor components of said received signal in response to said first filter coefficient group to produce a postcursor estimation signal;

a transmission signal sequence generator for generating N transmission signal sequences;

a precursor estimation circuit connected to said filter-coefficient output circuit and said transmission signal sequence generator for estimating precursor components of said received signal in response to said second filter coefficient group and said N transmission signal sequences to produce N precursor estimation signals; and an adder connected to said transversal filter and said precursor estimation circuit for adding said postcursor estimation signal to each of said N precursor estimation signals to produce each of said N estimated received-signals.

9. A method for generating a sampling clock in an automatic equalizer which comprises detection means for producing a part of a transmission signal sequence in response to difference between a sampled received-signal and each of N estimated received signals (N: a positive integer), said sampled received-signal being obtained by sampling a received signal with a sampling clock, impulse-response calculation means for producing impulse-response signals in response to said sampled received-signal, received-signal estimation means for producing said N estimated received signals by the use of a tab coefficient of one among said impulse-response signals corresponding to a sample timing selected from L sample timings (L: a positive integer) with a tap-coefficient selection signal, and sampling-clock producing means for, before selecting said sample timing, producing a sampling clock at the rate of L times of that after selecting, and after selecting said sample timing, producing said tap-coefficient selection signal according to said sample timing, and a sampling clock at the rate of 1/L times of that before selecting, according to said sample timing, said method comprising:

a primary obtaining step of obtaining demodulation components in absolute values of said impulse-response signals with respect to said L sample timings, respectively;

a selecting step of selecting said sample timing by the use of said demodulation components; and a secondary obtaining step of obtaining distortion components in said absolute values, respectively, said selecting step being of selecting said sample timing by the use of said distortion components together with said demodulation components.

10. A method as claimed in claim 9, wherein said secondary obtaining step is of obtaining, as said distortion components, postcursor components in said absolute values, respectively, said method further comprising a calculating step of summing said demodulation components and a sum of said postcursor components with respect to said L sample timings to produce summed values, respecively, said selecting step being of selecting, as said sample timing, a timing corresponding to a greatest one of said summed values.

11. A method as claimed in claim 9, wherein said secondary obtaining step is obtaining, as said distortion components, precursor components in said absolute values, respectivley, said method further comprising a dividing step of dividing said demodulation components by a sum of said precursor components to produce divided values, respectively, said selecting step being of selecting, as said sample timing, a timing corresponding to a greatest one of said divided values.

12. A method as claimed in claim 9, wherein said secondary obtaining step is of obtaining, as said distortion components, precursor components in said absolute values, respectively, said method further comprising a dividing step of dividing said demodulation components by a largest one of said precursor components to produce divided values, respectively, said selecting step being of selecting, as said sample timing, a timing corresponding to a greatest one of said divided values.

13. A method as claimed in claim 9, wherein said secondary obtaining step is obtaining, as said distortion components, precursor components and postcursor components in said absolute values, respectively, said method further comprising:

a summing step of summing said demodulation components and said postcursor components to produce summed values with respect to said L sample timings, respectively; and a dividing step of dividing said summed values by a sum of said precursor components to produce divided values, with respect said L sample timings, respectively, said selecting step selecting, as said sample timing, timing corresponding to a greatest one of said divided values.

14. A method as claimed in claim 9, wherein said selecting step is selecting, as said sample timing, a timing corresponding to a greatest one of said demodulation components.

15. A recording medium in which a control program is stored for making a computer control an automatic equalizer comprising detection means for producing a part of a transmission signal sequence in response to difference between a sampled received-signal and each of N estimated received signals (N: a positive integer), said sampled received-signal being obtained by sampling a received signal with a sampling clock, impulse-response calculation means for producing impulse-response signals in response to said sampled received signal, received-signal estimation means for producing said N estimated received signals by the use of a tab coefficient of one among said impulse-response signals corresponding to a sample timing selected from L sample timings (L: a positive integer) with a tap-coefficient selection signal, and sampling-clock producing means for, before selecting said sample timing, producing a sampling clock at the rate of L times of that after selecting, and after selecting said sample timing, producing said tap-coefficient selection signal according to said sample timing, and a sampling clock at the rate of 1/L times of that before selecting, according to said sample timing, wherein:

said control program makes said computer be operable as primary obtaining means for obtaining demodulation components in absolute values of said impulse-response signals with respect to said L sample timings, respectively, as selecting means for selecting said sample timing by the use of said demodulation components, and as secondary obtaining means for obtaining distortion components in said absolute values, respectively, said selecting means selecting said sample timing by the use of said distortion components together with said demodulation components.

16. A recording medium as claimed in claim 15, wherein said secondary obtaining means obtains, as said distortion components, postcursor components in said absolute values, respectively, said control program making said computer be operable as calculating means for summing said demodulation components and a sum of said postcursor components with respect to said L sample timings to produce summed values, respectively, said selecting means selecting, as said sample timing, a timing corresponding to a greatest one of said summed values.

17. A recording medium as claimed in claim 15, wherein said secondary obtaining means obtains, as said distortion components, precursor components in said absolute values, respectively, said control program making said computer be operable as dividing means for dividing said demodulation components by a sum of said precursor components to produce divided values, respectively, said selecting means selecting, as said sample timing, a timing corresponding to a greatest one of said divided values.

18. A recording medium as claimed in claim 15, wherein said secondary obtaining means obtains, as said distortion components, precursor components in said absolute values, respectively, said control program making said computer be operable as dividing means for dividing said demodulation components by a largest one of said precursor components to produce divided values, respectively, said selecting means selecting, as said sample timing, a timing corresponding to a greatest one of said divided values.

19. A recording medium as claimed in claim 15, wherein said secondary obtaining means obtains, as said distortion components, precursor components and postcursor components in said absolute values, respectively, said control program making said computer be operable as summing means for summing said demodulation components and said postcursor components to produce summed values with respect to said L sample timings, respectively, and as dividing means for dividing said summed values by a sum of said precursor components to produce divided values, with respect said L sample timings, respectively, said selecting means selecting, as said sample timing, a timing corresponding to a greatest one of said divided values.

20. A recording medium as claimed in claim 15, wherein said selecting means selects, as said sample timing, a timing corresponding to a greatest one of said demodulation components.

* * * * *